US012013096B2

(12) United States Patent
Won

(10) Patent No.: US 12,013,096 B2
(45) Date of Patent: Jun. 18, 2024

(54) LASER LAMP MODULE AND LASER LAMP SYSTEM USING THE SAME

(71) Applicant: HYUNDAI MOBIS CO., LTD., Seoul (KR)

(72) Inventor: Yong Hee Won, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/482,782

(22) Filed: Oct. 6, 2023

(65) Prior Publication Data

US 2024/0142078 A1 May 2, 2024

(30) Foreign Application Priority Data

Oct. 26, 2022 (KR) ........................ 10-2022-0139102

(51) Int. Cl.

| | |
|---|---|
| *H04N 5/225* | (2006.01) |
| *F21S 41/16* | (2018.01) |
| *F21S 41/176* | (2018.01) |
| *F21S 41/20* | (2018.01) |
| *F21S 41/25* | (2018.01) |
| *F21S 41/63* | (2018.01) |
| *F21Y 115/30* | (2016.01) |

(52) U.S. Cl.

CPC ............. *F21S 41/635* (2018.01); *F21S 41/16* (2018.01); *F21S 41/176* (2018.01); *F21S 41/25* (2018.01); *F21S 41/285* (2018.01); *F21Y 2115/30* (2016.08)

(58) Field of Classification Search

CPC ........ F21S 41/635; F21S 41/16; F21S 41/176; F21S 41/25; F21S 41/285; F21Y 2115/30

See application file for complete search history.

(56) References Cited

U.S. PATENT DOCUMENTS

2017/0048435 A1* 2/2017 Oki ........................ H04N 23/56
2020/0158312 A1* 5/2020 Dattner ................ G02B 27/141

FOREIGN PATENT DOCUMENTS

KR 2016-0007922 1/2016

OTHER PUBLICATIONS

English Language Abstract of KR 2016-0007922 published Jan. 21, 20216.

* cited by examiner

Primary Examiner — Elmito Breval
(74) Attorney, Agent, or Firm — DLA Piper LLP (US)

(57) ABSTRACT

A laser lamp module and a laser lamp system using the same, and more particularly, a laser lamp module capable of implementing a highlight zone and a shadow zone by selectively positioning a plurality of beam splitters in a path to which a beam is emitted from a laser light source to adjust outputs of beams reflected from the beam splitters, and a laser lamp system using the same.

11 Claims, 6 Drawing Sheets

LASER LAMP MODULE AND LASER LAMP SYSTEM USING THE SAME

CROSS-REFERENCE TO RELATED APPLICATIONS

This application claims priority under 35 U.S.C. § 119 to Korean Patent Application No. 10-2022-0139102, filed on Oct. 26, 2022, in the Korean Intellectual Property Office, the disclosure of which is incorporated herein by reference in its entirety.

TECHNICAL FIELD

The following disclosure relates to a laser lamp module and a laser lamp system using the same, and more particularly, to a laser lamp module capable of implementing a highlight zone and a shadow zone by selectively positioning a plurality of beam splitters in a path to which a beam is emitted from a laser light source to adjust outputs of beams reflected from the beam splitters, and a laser lamp system using the same.

BACKGROUND

A headlamp (front lamp) of a vehicle is a lamp that provides illumination ahead to secure a driver's forward vision, and usually uses halogen, high intensity discharge (HID), or LED diodes as a light source.

However, halogen, HID, LED diodes, and the like are disadvantageous in that the light efficiency is low because of the high power consumption, and in particular, the degree of freedom in design is low and the weight is heavy because of the large size of the entire optical system including a light source and a lens.

It is a recent trend to develop a headlamp using a laser diode that is environmentally friendly while having a long lifespan with high light efficiency as a light source.

A conventional laser optical system for a headlamp includes a laser diode generating a laser beam in a blue wavelength band; a phosphor reacting with the light output from the laser diode to output white light; a reflector reflecting the white light output from the phosphor ahead; and an aspheric lens located in front of the reflector to condense the white light reflected through the reflector and emit the condensed white light in a diffused manner ahead.

However, the conventional laser optical system as described above has a problem in that it is not possible to implement a high beam function and an adaptive driving beam (ADB) function, which are main functions of lamps that have recently been distributed.

PRIOR ART DOCUMENT

Patent Document

Korean Patent Laid-Open Publication No. 10-2016-0007922

SUMMARY

An embodiment of the present invention is directed to providing a laser lamp module capable of implementing a highlight zone and a shadow zone by selectively positioning a plurality of beam splitters in a path to which a beam is emitted from a laser light source to adjust outputs of beams reflected from the beam splitters, and capable of implementing an adaptive driving beam (ADB) function by individually setting a reflectance and a transmittance for each of the plurality of beam splitters, and a laser lamp system using the same.

In one general aspect, a laser lamp module includes: a laser light source; a plurality of beam splitters sequentially spaced apart from one another in a direction in which a beam is emitted from the laser light source, each of the beam splitters provided with a split coating surface inclined at an angle set with respect to the direction in which the beam is emitted to split the beam incident thereon into a transmitted beam and a reflected beam; a plurality of driving units installed for the plurality of beam splitters, respectively, to rotate each of the beam splitters by a predetermined angle so that the beam splitter is selectively positioned in a path to which the beam is emitted; and a control unit controlling the plurality of driving units, based on target highlight and shadow zones, so that the reflected beam is output into the highlight zone and the reflected beam is not output into the shadow zone.

The laser lamp module may further include a fluorescent plate installed in a path of the beam reflected from each of the plurality of beam splitters to diffuse the beam incident thereon, wherein a fluorescent layer is formed on one surface of the fluorescent plate to change a color of the incident beam.

The laser lamp module may further include an optical lens installed behind the fluorescent plate to output the beam diffused from the fluorescent plate at a desired angle of view.

The plurality of beam splitters may output reflected beams having different intensities by individually setting a reflectance and a transmittance of the split coating surface for each of the plurality of beam splitters.

The beam splitter may be one of a cube splitter and a plate splitter, the cube splitter being formed in a hexahedral shape with the split coating surface therein, and the plate splitter being formed in a plate shape with the split coating surface on one surface thereof.

When the beam splitter is a plate splitter, the plate splitter is disposed to be inclined in such a manner that an angle of intersection between a lower portion of the split coating surface of the plate splitter and the beam is 45°.

The plurality of plate splitters may be sequentially arranged in the direction in which the beam is emitted in such a manner that there is a difference in height between adjacent plate splitters, and a plate splitter closer to the laser light source has a larger height.

The difference in height may be set based on a beam shift distance d between the plate splitters.

When the beam splitter is a cube splitter, the cube splitter may be disposed in such a manner that an angle of intersection between a lower portion of the split coating surface of the cube splitter and the beam is 45°, and the plurality of cube splitters may be sequentially arranged in the direction in which the beam is emitted.

The laser lamp module may further include an absorber spaced apart from a last one of the plurality of beam splitters in the direction in which the beam is emitted to absorb a transmitted beam output from the last beam splitter.

In another general aspect, a laser lamp system includes a plurality of laser lamp modules arranged in at least one of a vertical direction and a horizontal direction, each of the laser lamp modules being the above-described laser lamp module.

According to the present invention, a highlight zone and a shadow zone can be adjusted in a lamp output area by selectively positioning the plurality of beam splitters in the path to which the beam is emitted from the laser light source to adjust outputs of beams reflected from the beam splitters.

Furthermore, an adaptive driving beam (ADB) function can be implemented by individually setting a reflectance and a transmittance for each of the plurality of beam splitters.

DETAILED DESCRIPTION OF MAIN ELEMENTS

Figure 1:
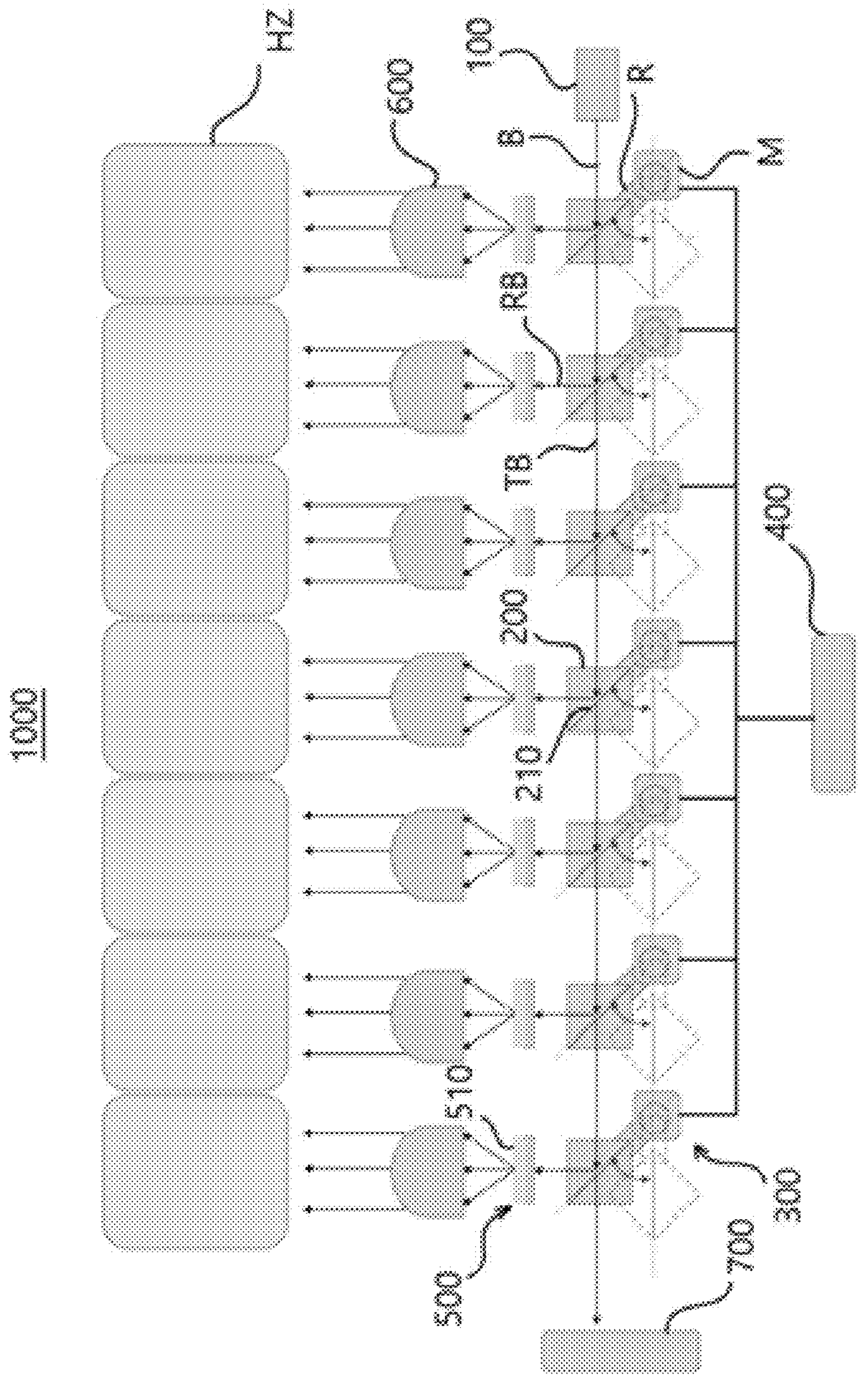
FIG. 1 is a schematic diagram illustrating a laser lamp module according to an embodiment of the present invention.

100: Laser light source
200: Beam splitter
210: Split coating surface
300: Driving unit
400: Control unit
500: Fluorescent plate
510: Fluorescent layer
600: Optical lens
700: Absorber
1000: Laser lamp module
2000: Laser lamp system
B: Beam
TB: Transmitted beam
RB: Reflected beam
HZ: Highlight zone
SZ: Shadow zone
M: Motor
R: Rotatable rod

DETAILED DESCRIPTION OF EMBODIMENTS

With reference to the accompanying drawings, embodiments of the present invention will be described in detail so that one of ordinary skill in the art to which the present invention pertains can easily carry out the embodiments. The present invention may be implemented in various different forms and is not limited to the embodiments described herein. To clearly describe the present invention, parts unrelated to the description have been omitted from the drawings, and like reference signs are used to denote like or similar elements throughout the specification. In addition, detailed descriptions of widely known technologies will be omitted.

Throughout the specification, when it is said that a certain part "includes" a certain component, this means that the part may further include another component rather than excluding another component unless particularly specified otherwise.

Figure 2:
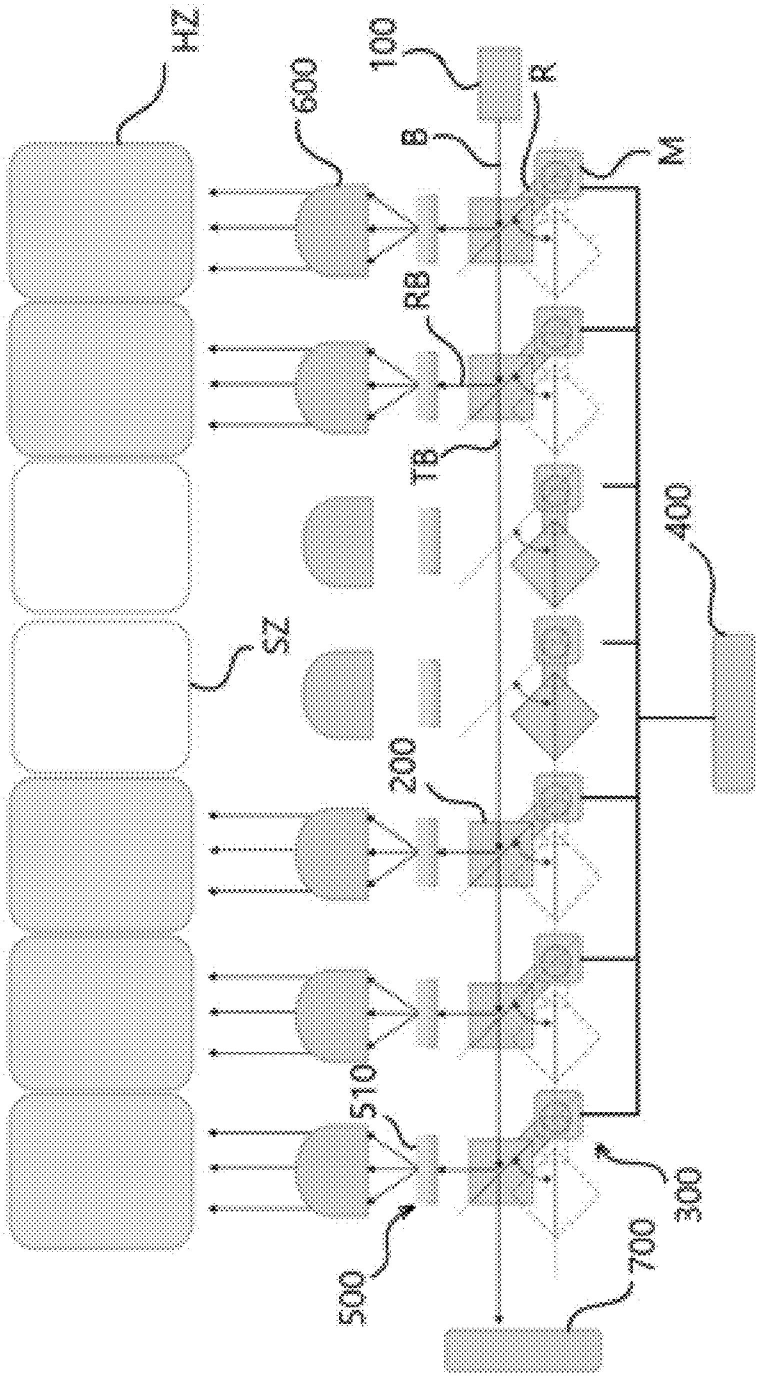
FIG. 2 is a diagram illustrating how to implement a highlight zone and a shadow zone according to an embodiment of the present invention.

FIG. 1 is a schematic diagram illustrating a laser lamp module according to an embodiment of the present invention, and FIG. 2 is a diagram illustrating how to implement a highlight zone and a shadow zone according to an embodiment of the present invention.

Referring to FIGS. 1 and 2, a laser lamp module 1000 according to an embodiment of the present invention mainly includes: a laser light source 100 emitting a laser beam; a plurality of beam splitters 200 sequentially spaced apart from one another in a direction in which a beam B is emitted from the laser light source 100, each of the beam splitters 200 provided with a split coating surface 210 inclined at an angle set with respect to the direction in which the beam B is emitted to split the beam B incident thereon into a transmitted beam TB and a reflected beam RB; a plurality of driving units 300 installed for the plurality of beam splitters 200, respectively, to rotate each of the beam splitters 200 by a predetermined angle so that the beam splitter 200 is selectively positioned in a path to which the beam B is emitted; and a control unit 400 controlling the plurality of driving units 300, based on target highlight and shadow zones HZ and SZ, so that the reflected beam RB is output into the highlight zone HZ and the reflected beam RB is not output into the shadow zone SZ.

Here, the laser light source 100 is a light source that outputs a laser, and the term "laser" is defined as light amplification by stimulated emission of radiation.

The direction, frequency, and phase of light generated by stimulated emission, i.e., photons, completely coincide with those of incident photons that have caused the stimulated emission. Accordingly, the laser is excellent in directivity, light condensing property, and coherency, and has very high brightness.

Such types of lasers are systematically classified into solid lasers, gas lasers, liquid lasers, semiconductor lasers, and the like, and the wavelength of the laser is determined according to the medium of the laser.

The present invention is not limited to the type of these lasers, and any type of laser may be adopted as needed.

Meanwhile, the plurality of beam splitters 200 are disposed to be spaced apart from one another in a path to which the beam B is emitted from the laser light source 100, each of the beam splitters 200 being provided to split the beam B incident thereon into a reflected beam RB and a transmitted beam TB through the split coating surface 210. Among the plurality of beam splitters 200, a beam splitter 200 closest to the laser light source 100 receives the beam B emitted from the laser light source 100 and splits the beam B incident thereon into a transmitted beam TB and a reflected beam RB, and a beam splitter 200 adjacent to the beam splitter 200 closest to the laser light source 100 receives the transmitted beam TB from the previous beam splitter 200 and also splits the beam B incident thereon into a reflected beam RB and a transmitted beam TB.

This process is consecutively performed by the plurality of beam splitters 200, and the transmitted beam TB split through the split coating surface 210 of the last beam splitter 200 is absorbed by an absorber 700 located in the radiation path of the transmitted beam TB.

Meanwhile, in a case where each of the plurality of beam splitters 200 is configured in a cube shape as in an embodiment of the present invention, the split coating surface 210 provided in the beam splitter 200 may be an adhesive surface to which two triangular glass prisms are bonded, with a coating layer formed of a mixture such as an epoxy or urethane-based adhesive.

As illustrated in FIGS. 1 and 2, in a case where the beam splitter 200 is a cube splitter according to an embodiment of the present invention, the plurality of cube splitters are sequentially arranged in the beam-emitted direction in such a manner that an angle of intersection between a lower portion of the split coating surface 210 and the beam incident thereon is 45°.

In addition, the transmittance and reflectance of the split coating surface 210 may be set according to the process of forming the split coating surface 210, and thus, the laser lamp module according to the present invention may be configured to output reflected beams having different intensities to the respective detailed sections even within the highlight zone HZ.

It is needless to say that the transmittance and reflectance may be set differently for each of the plurality of beam splitters 200, or may be set equally for some of the plurality of beam splitters 200.

In addition, the driving unit 300 is provided to rotate the beam splitter 200 by a predetermined angle so that the beam splitter 200 is selectively positioned in the path to which the beam B is emitted. Whether or not the driving unit 300 rotates is determined under the control of the control unit 400.

The driving unit 300 is connected to one side of the beam splitter 200 to rotate the beam splitter 200 so that the beam splitter 200 having a cube splitter form is deviated from the beam-emitted path, and the driving unit 300 illustrated in FIGS. 1 and 2 includes a motor M and a rotatable rod R that rotates according to the rotation of the motor M by the predetermined angle.

It is needless to say that the driving unit 300 according to the present invention may be applied in any form as long as it is capable of rotating the beam splitter 200 by the predetermined angle.

Meanwhile, the control unit 400 is provided to control the plurality of driving units 300, based on target highlight and shadow zones HZ and SZ, so that the reflected beam RB is output into the highlight zone HZ and the reflected beam RB is not output into the shadow zone SZ. The target highlight and shadow zones HZ and SZ may be set by the control unit 400 as an adaptive driving beam (ABD) detects an object ahead.

For example, when a vehicle driving in the opposite lane approaches, the shadow zone SZ is set to the opposite vehicle so that a beam output from the lamp is not delivered to the opposite vehicle, and the highlight zone HZ is set to the other zone to secure visibility.

In order to set the highlight zone HZ and the shadow zone SZ, the control unit 400 may receive sensing information for setting the highlight zone HZ and shadow zone SZ from an external sensor or the like of the vehicle. Based on the highlight zone HZ and the shadow zone SZ set as described above, the control unit 400 controls the driving unit 300 to output the reflected beam RB to the highlight zone HZ or not to output the reflected beam RB to the shadow zone SZ.

In a case where shadow zones SZ and highlight zones HZ are set as illustrated in FIG. 2, the control unit 400 controls the driving units 300 to rotate beam splitters 200 that emit reflected beams to shadow zones in the beam-emitted path so that those beam splitters 200 are prevented from outputting the reflected beams RB.

On the other hand, a fluorescent plate 500 is installed in a path of a beam reflected from each of the plurality of beam splitters 200 to diffuse the reflected beam RB incident from the beam splitter 200, and a fluorescent layer 510 is formed on one surface of the fluorescent plate 500 to change a color of the incident beam reflected from the beam splitter 200.

According to an example, the fluorescent layer 510 is capable of changing a blue color of the laser light source 100 to a white color.

In addition, an optical lens 600 is installed behind each of the fluorescent plates 500 to output the beam diffused from the fluorescent plate 500 at a desired angle of view.

Figure 3:
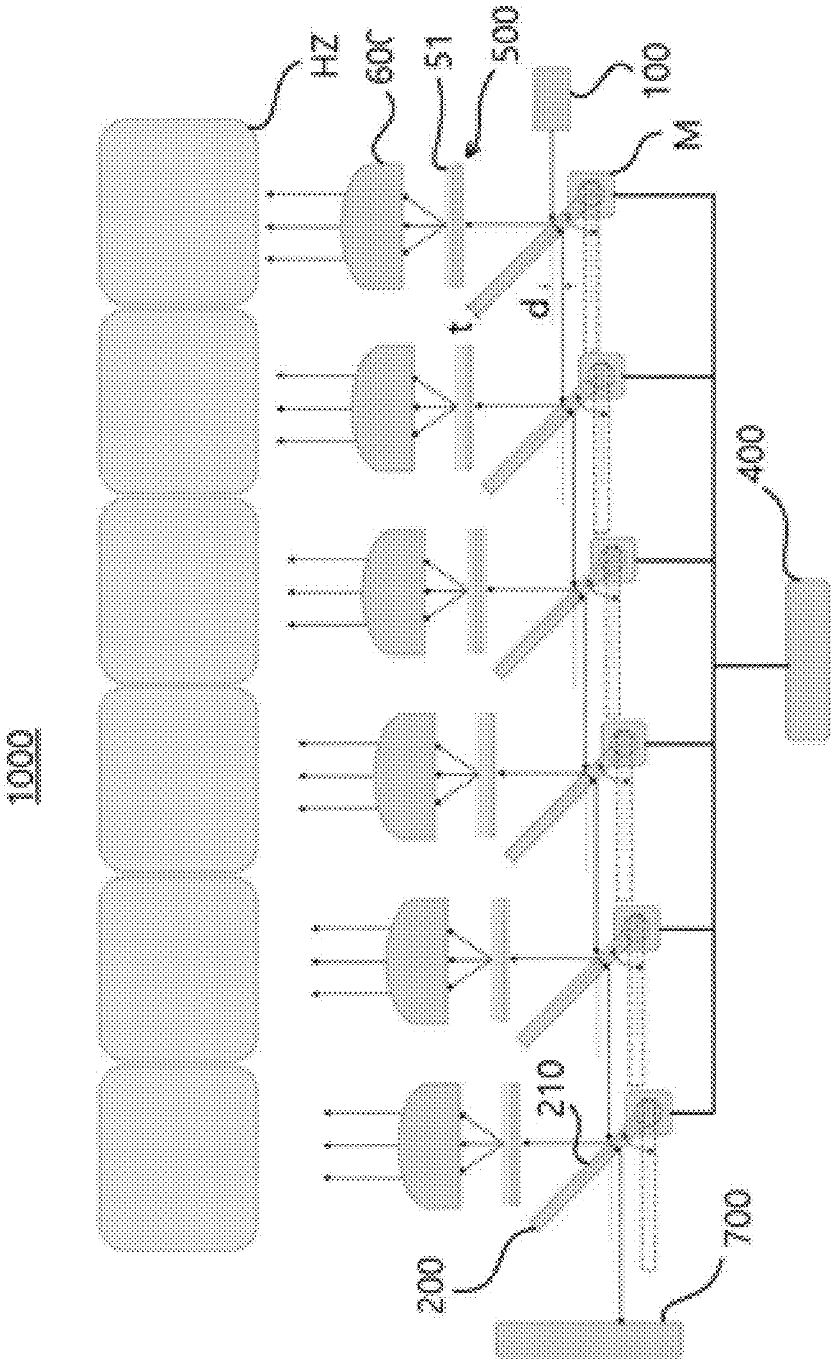
FIG. 3 is a schematic diagram illustrating a laser lamp module according to another embodiment of the present invention.
Figure 4:
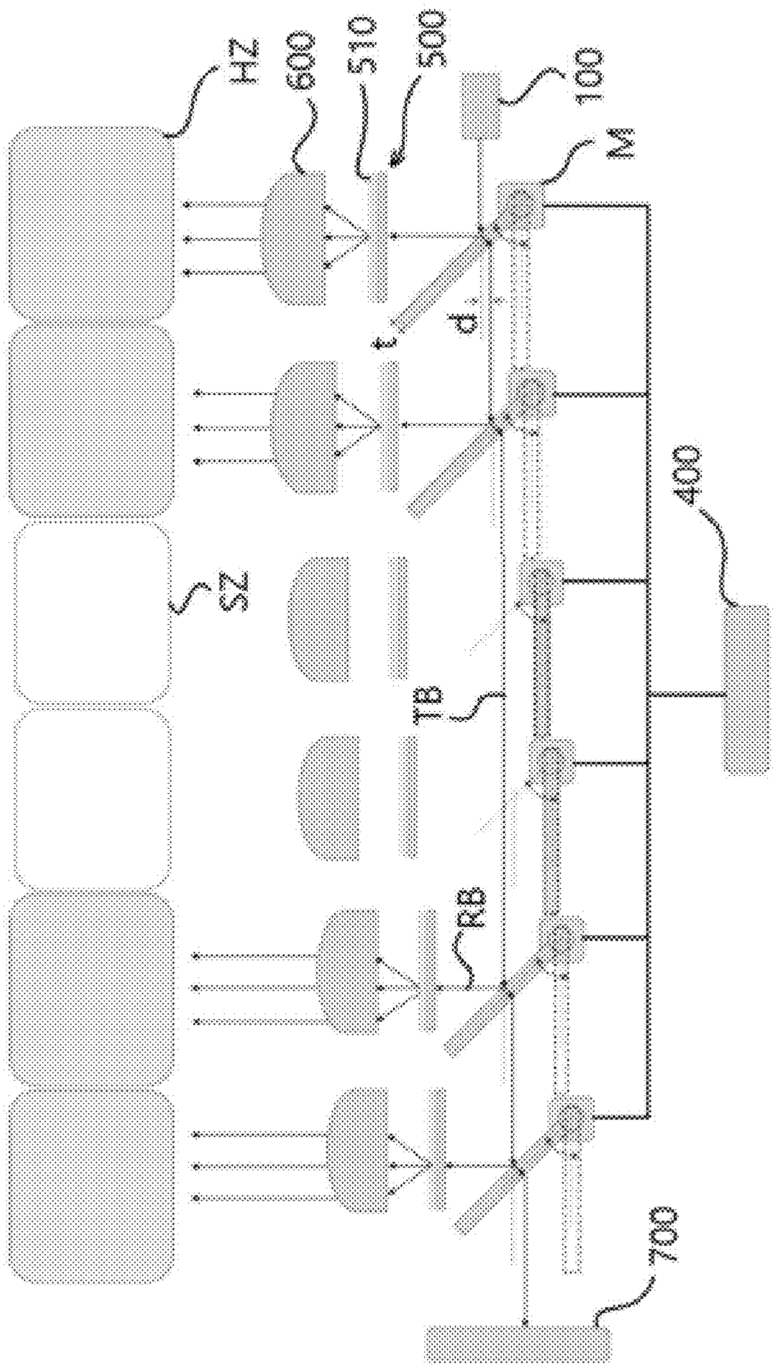
FIG. 4 is a diagram illustrating how to implement a highlight zone and a shadow zone according to another embodiment of the present invention.

FIG. 3 is a schematic diagram illustrating a laser lamp module according to another embodiment of the present invention, and FIG. 4 is a diagram illustrating how to implement a highlight zone and a shadow zone according to another embodiment of the present invention.

Referring to FIGS. 3 and 4, a laser lamp module 1000 according to the present embodiment includes beam splitters 200 that are plate splitters each being formed in a plate shape with the split coating surface 210 on one surface thereof.

Such a plate splitter may be formed of an optical substrate that is a glass or plastic sheet with the split coating surface 210 being a thin metal coating that is partially transparent. The thin coating may be formed by depositing aluminum from aluminum vapor using a physical vapor deposition method.

For example, the deposited material has a thickness capable of transmitting some of the light and reflecting the other of the light when the beam is incident at an angle of 45° with respect to the split coating surface 210.

That is, the plate splitter is disposed to be inclined in such a manner that an angle of intersection between a lower portion of the split coating surface 210 of the plate splitter and the beam B incident thereon is 45°.

In such a plate splitter, a beam shift distance d is generated according to a thickness t of the plate. As illustrated in FIGS. 3 and 4, the plurality of plate splitters may be configured in such a manner that their installation heights are sequentially lowered by the beam shift distance d.

It is needless to say that the plurality of plate splitters may be sequentially arranged at the same height in the beam-emitted path, but in this case, the number of plate splitters that can be installed is limited due to the beam shift distance d.

In addition, even in a case where the plurality of plate splitters are configured in such a manner that their installation heights are sequentially lowered based on the beam shift distance d, it may be required to limit the number of plate splitters that can be installed because a beam shift distance d is not generated when a plate splitter is deviated from the beam-emitted path by driving the driving unit 300 as illustrated in FIG. 4.

Although the plurality of plate splitters are arranged in such a manner that their installation heights are sequentially lowered due to the generation of the beam shift distance in FIGS. 3 and 4, the plurality of plate splitters may be configured in such a manner that two or three plate splitters are set to have the same height, and two or three adjacent plate splitters following the plate splitters having the same height are set to have a lower height than the preceding plate splitters.

Figure 5:
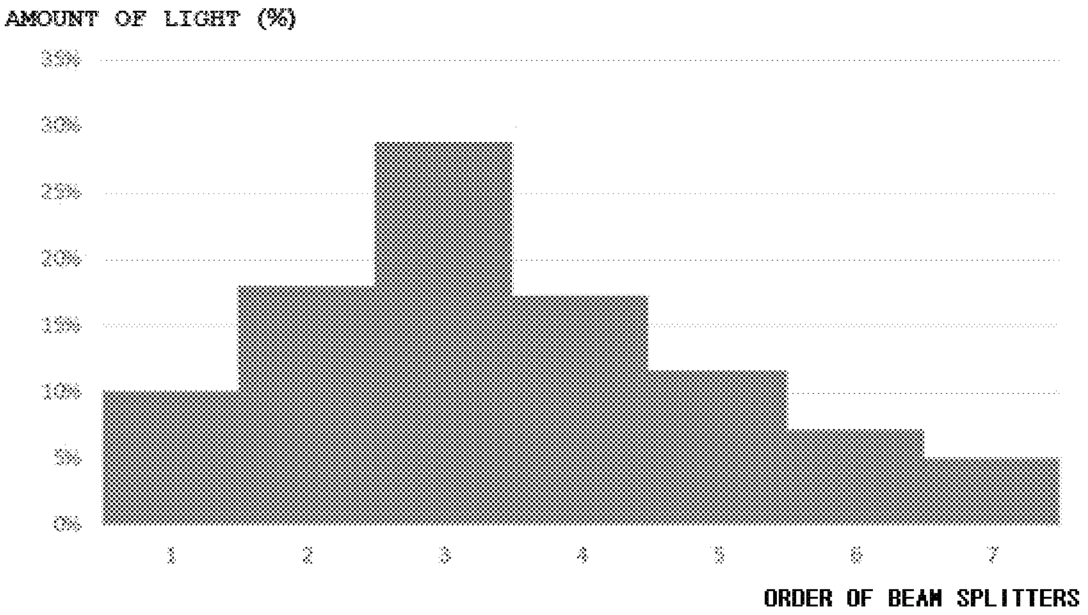
FIG. 5 is a diagram illustrating an intensity of a reflected beam in a state where a reflectance and a transmittance are set for each beam splitter according to an embodiment of the present invention.
Figure 6:
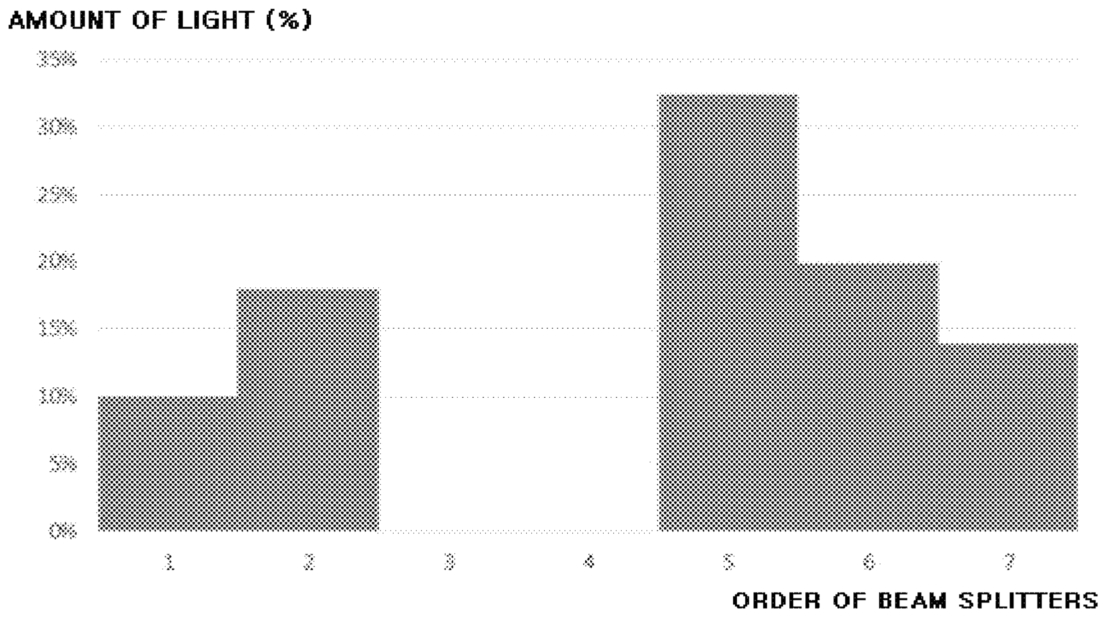
FIG. 6 is a diagram illustrating a change in intensity of a reflected beam as shadow zones are formed as in FIG. 5.

FIG. 5 is a diagram illustrating an intensity of a reflected beam in a state where a reflectance and a transmittance are set for each beam splitter according to an embodiment of the present invention, and FIG. 6 is a diagram illustrating a change in intensity of a reflected beam as shadow zones are formed as in FIG. 5.

In FIG. 5, numbers are given to the beam splitters in order of proximity to the laser light source in FIG. 1, and a transmittance, a reflectance, an amount of transmitted light, and an amount of reflected light for each beam splitter are shown in Table 1.

TABLE 1

| | 1 | 2 | 3 | 4 | 5 | 6 | 7 |
|---|---|---|---|---|---|---|---|
| Transmittance (%) | 90 | 80 | 60 | 60 | 55 | 50 | 30 |
| Reflectance (%) | 10 | 20 | 40 | 40 | 45 | 50 | 70 |
| Amount of transmitted light (%) | 90 | 72 | 43 | 26 | 14 | 7 | 2 |
| Amount of reflected light (%) | 10 | 18 | 29 | 17 | 12 | 7 | 5 |

Referring to FIG. 5, the present invention may be configured to implement a high beam function by individually setting a reflectance and a transmittance for each of the plurality of beam splitters. As illustrated in FIG. 5, the beam splitter 200 located at the center among the plurality of beam splitters 200 is set to have a high reflectance, and the other splitters are set to have reflectances that gradually decrease as being farther away from the central beam splitter 200 in both directions, such that the central beam splitters output beams having strong intensities and the peripheral beam splitters output beams having weak intensities.

In FIG. 6, an amount of reflected light is shown in a case where the third and fourth beam splitters 200, among the plurality of beam splitters according to FIG. 5 and [Table 1], are deviated from the beam path by controlling the driving units 300, and at this time, a transmittance, a reflectance, an amount of transmitted light, and an amount of reflected light for each beam splitter are shown in Table 2.

TABLE 2

| | 1 | 2 | 3 | 4 | 5 | 6 | 7 |
|---|---|---|---|---|---|---|---|
| Transmittance (%) | 90 | 80 | 100 | 100 | 55 | 50 | 30 |
| Reflectance (%) | 10 | 20 | 40 | 40 | 45 | 50 | 70 |
| Amount of transmitted light (%) | 90 | 72 | 72 | 72 | 40 | 20 | 6 |
| Amount of reflected light (%) | 10 | 18 | 0 | 0 | 32 | 20 | 14 |

As shown in FIG. 6 and [Table 2], it can be seen that the intensities of the output beams are changed when beam splitter numbers 3 and 4, which are central beam splitters, are deviated from the beam path and do not output reflected beams.

That is, the laser lamp module 1000 according to the present invention can realize an adaptive driving beam (ADB) that is superior in energy efficiency to other typical types of ADBs, by minimizing the loss of the intensity of the light source, because an intensity of a beam for a shadow zone is transmitted to another zone, rather than blocking the reflected beam when the shadow zone is formed.

Figure 7:
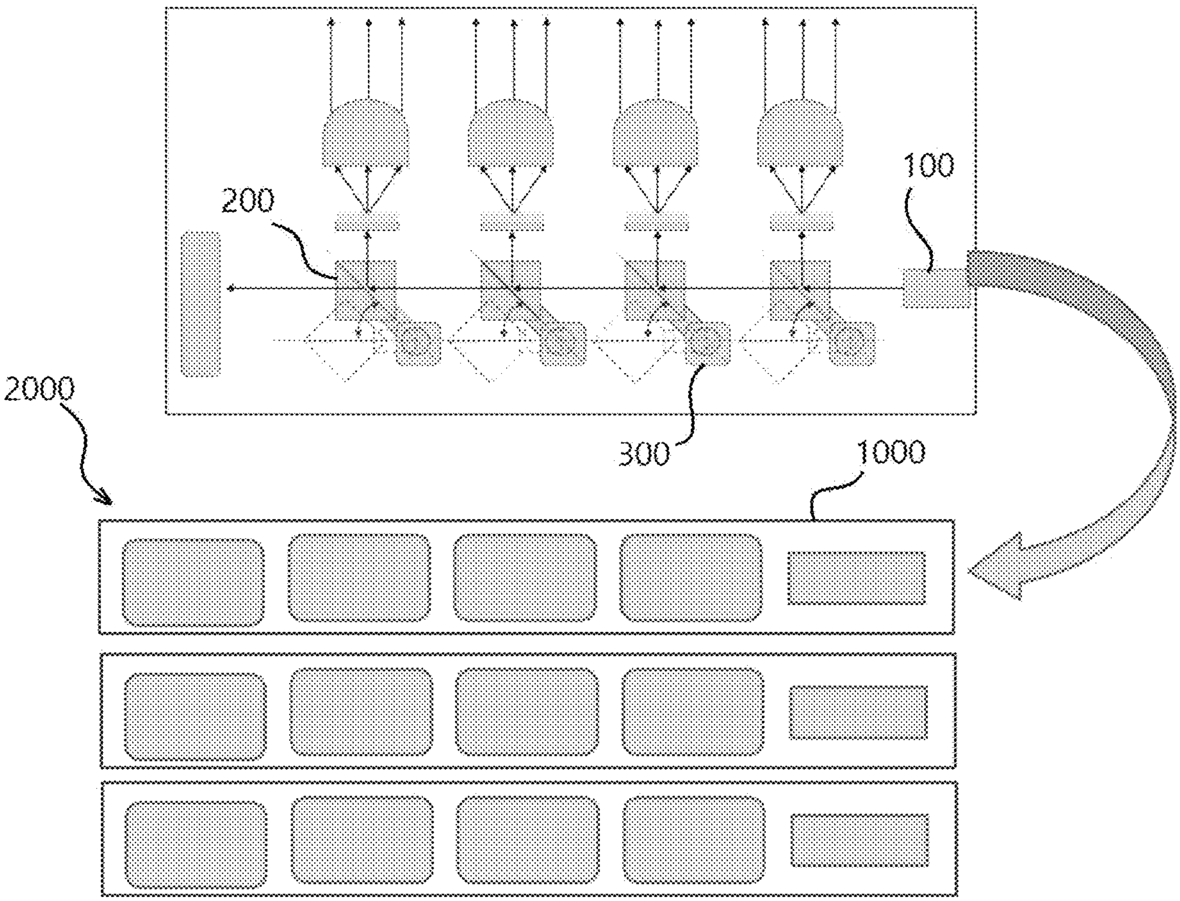
FIG. 7 is a schematic diagram illustrating a laser lamp according to an embodiment of the present invention.

FIG. 7 is a schematic diagram illustrating a laser lamp according to an embodiment of the present invention.

Referring to FIG. 7, a laser lamp system 2000 according to an embodiment of the present invention includes a plurality of laser lamp modules 1000 arranged in at least one of a first direction and a second direction orthogonal to the first direction, each of the laser lamp modules 1000 having the above-described cube splitters or plate splitters.

Here, the first direction may be a left/right horizontal direction based on the front of the vehicle when the laser lamp modules 1000 are installed according to an example, and the second direction orthogonal to the first direction may be an up/down vertical direction.

In addition, separately control units 400 may be provided for the laser lamp modules 1000, respectively. However, in order to simplify the lamp configuration, one control unit 400 may be provided to control all of the laser lamp modules 1000.

As described above, the laser lamp system 2000 includes a plurality of laser lamp modules 1000 and controls the plurality of laser lamp modules 1000 through the control unit 400 to adjust output intensities of reflected beams such that the high beam function can be implemented, and to adjust a highlight zone HZ and a shadow zone SZ such that the ADB function can be implemented.

Although the preferred embodiments of the present invention have been described above, the present invention is not limited to the above-described specific embodiments. That is, those skilled in the art to which the present invention pertains may make numerous changes and modifications to the present invention without departing from the spirit and scope of the appended claims, and all of such appropriate changes and modifications shall be regarded as falling within the scope of the present invention as equivalents.

What is claimed is:

1. A laser lamp module comprising:

a laser light source;

a plurality of beam splitters sequentially spaced apart from one another in a direction in which a beam is emitted from the laser light source, each of the beam splitters provided with a split coating surface inclined at an angle with respect to the direction in which the beam is emitted to split the beam incident thereon into a transmitted beam and a reflected beam;

a plurality of driving units installed for the plurality of beam splitters, respectively, configured to rotate each of the beam splitters by a predetermined angle so that the beam splitter is selectively positioned in a path to which the beam is emitted; and a control unit configured to control the plurality of driving units, based on target highlight and shadow zones, so that the reflected beam is output into the highlight zone and the reflected beam is not output into the shadow zone.

2. The laser lamp module of claim 1, further comprising a fluorescent plate installed in a path of the beam reflected from each of the plurality of beam splitters and configured to diffuse the beam incident thereon, wherein a fluorescent layer is formed on one surface of the fluorescent plate to change a color of the incident beam.

3. The laser lamp module of claim 2, further comprising an optical lens installed behind the fluorescent plate configured to output the beam diffused from the fluorescent plate at a desired angle of view.

4. The laser lamp module of claim 1, wherein the plurality of beam splitters are configured to output reflected beams having different intensities by individually setting a reflectance and a transmittance of the split coating surface for each of the plurality of beam splitters.

5. The laser lamp module of claim 4, wherein the beam splitter is one of a cube splitter and a plate splitter, the cube splitter being formed in a hexahedral shape with the split coating surface therein, and the plate splitter being formed in a plate shape with the split coating surface on one surface thereof.

6. The laser lamp module of claim 5, wherein when the beam splitter is a plate splitter, the plate splitter is disposed to be inclined such that an angle of intersection between a lower portion of the split coating surface of the plate splitter and the beam is 45°.

7. The laser lamp module of claim 6, wherein a plurality of plate splitters are sequentially arranged in the direction in which the beam is emitted such that there is a difference in height between adjacent plate splitters, and a plate splitter closer to the laser light source has a larger height.

8. The laser lamp module of claim 7, wherein the difference in height is set based on a beam shift distance d between the plate splitters.

9. The laser lamp module of claim 5, wherein when the beam splitter is a cube splitter, the cube splitter is disposed such that an angle of intersection between a lower portion of the split coating surface of the cube splitter and the beam is 45°, and a plurality of cube splitters are sequentially arranged in the direction in which the beam is emitted.

10. The laser lamp module of claim 1, further comprising an absorber spaced apart from a last one of the plurality of beam splitters in the direction in which the beam is emitted and configured to absorb a transmitted beam output from the last beam splitter.

11. A laser lamp system comprising a plurality of laser lamp modules arranged in at least one of a first direction and a second direction orthogonal to the first direction, each laser lamp module being the laser lamp module of claim 1.

* * * * *